United States Patent [19]
Suzukawa et al.

[11] 3,719,029
[45] March 6, 1973

[54] PROCESS FOR TREATING GASEOUS PRODUCTS OBTAINED BY THERMAL CRACKING OF HYDROCARBONS

[75] Inventors: Yuichi Suzukawa; Hisashi Kono; Kenji Terai; Atushi Kuribayashi; Yutaka Tamura; Hiroshi Fujii; Muneki Saito, all of Ube, Japan

[73] Assignee: Ube Industries, Ltd., Ube-shi, Yamaguchi-ken, Japan

[22] Filed: March 23, 1971

[21] Appl. No.: 127,224

[52] U.S. Cl. ........................... 55/91, 55/233
[51] Int. Cl. ............................. B01d 47/06
[58] Field of Search .......... 55/77, 79, 84, 90, 91, 233, 55/390; 260/679 R

[56] References Cited

UNITED STATES PATENTS

| 3,581,473 | 6/1971 | Ririe, Jr. | 55/233 |
| 2,881,231 | 4/1959 | Boyer | 260/679 R |
| 2,793,713 | 5/1957 | Fritz et al. | 55/79 |
| 2,789,149 | 4/1957 | Bogart et al. | 55/90 |
| 2,939,893 | 6/1960 | Parker et al. | 260/679 R |

Primary Examiner—Charles N. Hart
Attorney—Sherman and Shalloway

[57] ABSTRACT

A process for removing from a cracked gas product carbon and tar contained therein, which comprises spouting a high temperature cracked gas product containing carbon and tar, formed by thermal cracking of a hydrocarbon, from the bottom of a vessel in which inorganic solid particles are contained, thus forming a spouted bed of the solid particles in the vessel, and spraying water or a liquid hydrocarbon in the so formed spouted bed of the solid particles to thereby quench the cracked gas product and to simultaneously allow the carbon and tar contained in the cracked gas product to stick and adhere onto the surface of the solid particles.

6 Claims, 6 Drawing Figures

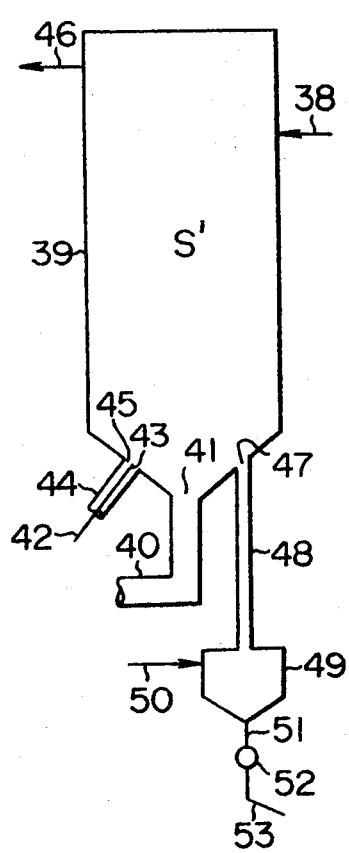
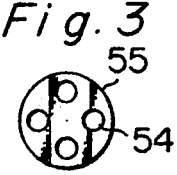
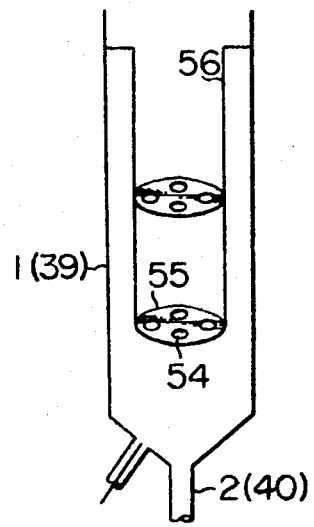

PROCESS FOR TREATING GASEOUS PRODUCTS OBTAINED BY THERMAL CRACKING OF HYDROCARBONS

This invention relates to a process for treating cracked gases of hydrocarbons, which comprises treating a high temperature cracked gas containing carbon and tar, which is formed by thermal cracking of a hydrocarbon, especially a heavy liquid hydrocarbon such as crude oil and heavy oil, in a spouted bed of solid particles, quenching the cracked gas and simultaneously removing carbon and tar efficiently from the intended gas components such as hydrogen, methane, acetylene, ethane, propylene, propane, butene, butadiene and carbon monoxide.

Methods of preparing olefins such as ethylene, propylene, butene and butadiene and hydrogen and the like by thermally cracking hydrocarbons such as crude oil, heavy oil, naphtha and natural gas at high temperatures have been known. High temperature cracked gases formed by such thermal cracking contain considerable amounts of carbon and tar, though their contents vary to some extent depending on the kind of hydrocarbon cracked, the cracking procedure, the cracking conditions and other factors.

In the thermal cracking of hydrocarbons, in order to prevent occurrence of undesired side-reactions which decrease the yield of intended gas components and increase amounts of undesired by-products, it is necessary to quench the high temperature cracked gas from the cracking reactor. During such quenching treatment carbon and tar contained in the cracked gas adhere to the quenching apparatus and are deposited thereon, which makes the quenching operation difficult or impossible. Not only for this reason, but also to obtain a refined gas, it is necessary to remove carbon and tar from the cracked gas.

Accordingly, various proposals have been made as to methods of quenching high temperature cracked gases and methods of removing carbon and tar from them, and many proposals are actually practiced industrially. For instance, a method is practiced comprising introducing a high temperature cracked gas into a heat exchanger or the like, quenching the cracked gas and simultaneously recovering the enthalpy of the cracked gas, washing the gas with water or a liquid hydrocarbon to thereby remove carbon and tar, and introducing the washed gas into the refining process.

Although such method is applicable to the treatment of cracked gases obtained by thermally cracking light hydrocarbons such as naphtha, when this method is applied to cracked gases of high contents of carbon and tar obtained by the thermal cracking of heavy hydrocarbons such as crude oil and heavy oil, carbon and tar adhere to the heat exchanger and are deposited thereon, with the result that the operation is made impossible. This is the fatal defect of the above method.

In the specification of Japanese Pat. Application Publication No. 41/19886 a method is proposed comprising contacting a cracked gas with large amounts of water and a liquid hydrocarbon in a counter-current manner to thereby wash the cracked gas, and thus quench the same and simultaneously remove carbon and tar. This method is, however, defective in that great amounts of water and liquid hydrocarbons must be used and it is necessary to refine great amounts of water and liquid hydrocarbons contaminated with carbon and tar before their recycle, which requires great expense and results in a great economical disadvantage.

From the specification of Japanese Pat. Application Publication No. 40/8329 a method is known comprising introducing a high temperature cracked gas obtained by the thermal cracking of, for instance, crude oil into a cyclone, and washing it with a liquid hydrocarbon to cool the gas and remove carbon and tar therefrom. Also in this method, carbon and tar tend to adhere to the cyclone and are easily deposited thereon. Further, in this method, since the cracked gas is cooled by evaporating the liquid hydrocarbon in a washing column, it is necessary to use a large amount of liquid hydrocarbon as in the above-mentioned method. For these reasons, this method is also defective.

Apart from the conventional concept of removing carbon and tar contained in a gaseous product comprising hydrogen, methane, ethylene, ethane, propylene, propane, butene, butadiene, carbon monoxide, carbon dioxide, oxygen, nitrogen, light oil, heavy oil, tar, carbon and steam, obtained by the thermal cracking of a hydrocarbon by contacting the gaseous product with a suitable washing liquid and thereby washing out carbon and tar from the gaseous product, research has been conducted and it has been found that when such gaseous product is cooled in a spouted bed of solid particles and simultaneously contacted with fluidized solid particles, carbon and tar components contained in the gaseous product are efficiently caught on the surfaces of solid particles, whereby carbon and tar components can be efficiently removed from the gaseous product without forming any contaminated washing liquid.

The primary object of this invention is to provide a process for easily removing carbon and tar simultaneously from a high temperature cracked gas obtained by the thermal cracking of a hydrocarbon, especially a heavy liquid hydrocarbon such as crude oil and heavy oil, in which such high temperature cracked gas is introduced into a spouted bed of solid particles, water or a liquid hydrocarbon is sprayed into the spouted bed, the cracked gas is quenched by utilizing the latent heat of vaporization of water or the liquid hydrocarbon and at the same time carbon is efficiently allowed to stick to the solid particles of the spouted bed by utilizing the adhesiveness of tar.

Another object of this invention is to provide a process for removing carbon and tar from a cracked gas product obtained by the thermal cracking of a hydrocarbon by quenching such cracked gas product of a high temperature without using a washing liquid, namely without formation of a great amount of a waster contaminated washing liquid.

In accordance with this invention, a process is provided for removing from a cracked gas product carbon and tar contained therein, which comprises spouting a high temperature cracked gas product containing carbon and tar, formed by the thermal cracking of a hydrocarbon, from the bottom of a vessel in which inorganic solid particles are contained, thus forming a spouted bed of the solid particles in the vessel, and spraying water or a liquid hydrocarbon in the so formed spouted bed of the solid particles to thereby quench the cracked gas product and to simultaneously allow the carbon and tar contained in the cracked gas product to stick and adhere onto surfaces of the solid particles.

Any of the cracked gases formed by the thermal cracking of hydrocarbons can be treated in the process of this invention. For instances, cracked gases formed by the thermal cracking of crude oil, heavy oil, naphtha, natural gas and methane may be treated in the process of this invention. These cracked gases inevitably contain carbon and tar in addition to valuable substances such as methane, acetylene, ethylene, ethane, propylene, propane, butene, butadiene, hydrogen and carbon monoxide. The process of this invention is suitable for the treatment of cracked gases of high carbon and tar contents obtained by the thermal cracking of heavy liquid hydrocarbons such as crude oil and heavy oil, especially for the treatment of cracked gases containing carbon and tar in a total amount of 20–100 g/Nm³.

These cracked gas products are generally withdrawn in the state heated to 700°–1,400° C. In this invention, quenching of cracked gas products of such high temperatures withdrawn from a cracking reactor and removal of carbon and tar are effectively accomplished.

It is important that the treatment according to this invention is conducted in a spouted bed or inorganic solid particles. By the term "spouted bed" used in the specification and claims is meant an ordinary spouted bed employed in the art, namely the bed of solid particles in which the solid particles are fluidized and forcibly circulated convectively in a vessel by injecting a fluid from a spout provided at the bottom of the vessel without a perforated gas distributor.

When a cracked gas product is treated in an ordinary fluidized bed, carbon and tar contained in the gas product adhere to a perforated gas distributor and choking of the distributor is frequently caused to occur. This disadvantage may be overcome if a refined cracked gas or steam is used for fluidizing solid particles. However, another disadvantage is brought about in that such refined cracked or steam must be used in great quantities. According to this invention this disadvantage is also overcome effectively by the use of a spouted bed.

As inorganic solid particles to be used for formation of a spouted bed, particles of any optional refractory material may be used. For instance, particles of inorganic solid substances such as mullite, alumina-silica, cement clinker, magnesia clinker and alumina may be used conveniently in this invention. Among them, mullite or alumina-silica particles are especially preferred because they resist a vigorous temperature change and the violent friction which they should encounter is the spouted bed. It is desired that these particles have a diameter of 0.1–6 mm, especially 1.5–4 mm.

The optimum temperature of the spouted bed varies depending on the kind and composition of the cracked gas to be treated, the contents of carbon and tar and the like. Accordingly, the optimum temperature cannot be simply determined based on one factor or other. However, it is generally preferably that the spouted bed is maintained at 200°–600°C., especially 300°–500° C. It has been found that tar having a boiling point slightly higher than the bed temperature tends to be easily caught on particles of the spouted bed.

The superficial gas velocity in an empty column, Uo (m/sec), of the cracked gas in the spouted bed is adjusted depending on the average diameter of the solid particles in the bed, the size distribution thereof, the heat transfer velocity in the bed and other factors, but in order to attain a good spouting state it is generally preferable to maintain the superficial gas velocity in an empty column at 1–10 m/sec, especially 2–5 m/sec.

The velocity of the cracked gas at the spout must be higher than the terminal velocity of the solid particles in the spouted bed. When particles of a diameter of 1.5–4.0 mm are used, it is desired to maintain the velocity of the cracked gas at the spout within a range of from 20 m/sec to 30 m/sec.

The ratio of the superficial gas velocity in an empty column, Uo (m/sec), to the superficial gas velocity at minimum fluidizing conditions, Umf (m/sec), namely the ratio of Uo/Umf, is adjusted within a range of from 1.5 to 10, preferably from 2 to 8.

With regard to the liquid hydrocarbon to be sprayed in the spouted bed for quenching the cracked gas product, it is preferable to use those having a boiling point lower than about 170° C. when the process is conducted at the bed temperature of 200°–300° C. and to use those having a boiling point not exceeding about 250° C. when the process is conducted at the bed temperature of 300°–600° C. In view of the effect of quenching the cracked gas and from the economical view point, it is desired to spray into the spouted bed water which has a great latent heat of vaporization and is easy to handle. Water or a liquid hydrocarbon is sprayed singly from an optional position of the spouted bed but a better diffusion of the sprayed liquid is attained by spraying the liquor from the lower portion of the spouted bed at a velocity higher than that of the cracked gas with use of steam or refined cracked gas. By such spraying, quenching of the high temperature cracked gas and sticking of carbon and tar onto the solid particles can be effectively accomplished.

The amount of the quenching liquid to be fed to the spouted bed varies to some extent depending on the latent heat of vaporization possessed by the quenching liquid, the temperature and specific heat of the cracked gas to be treated, the intended bed temperature and other factors. However, better results are obtained when the amount of quenching liquid fed is so adjusted that the bed temperature will be within a range of from 200° to 600° C., preferably, from 300° to 500° C.

This invention will now be detailed by referring to accompanying drawings.

FIG. 2 is a diagram illustrating the longitudinal section of another example of the apparatus suitable for the practice of the proc of this invention.

FIG. 3 is a plane view illustrating a baffle to be adapted to the apparatus of FIG. 1 or 2 suitable for the practice of the process of this invention.

FIG. 4 is a perspective view illustrating an example of the member of FIG. 3 adapted to the apparatus suitable for the practice of the process of this invention.

Figure 1:
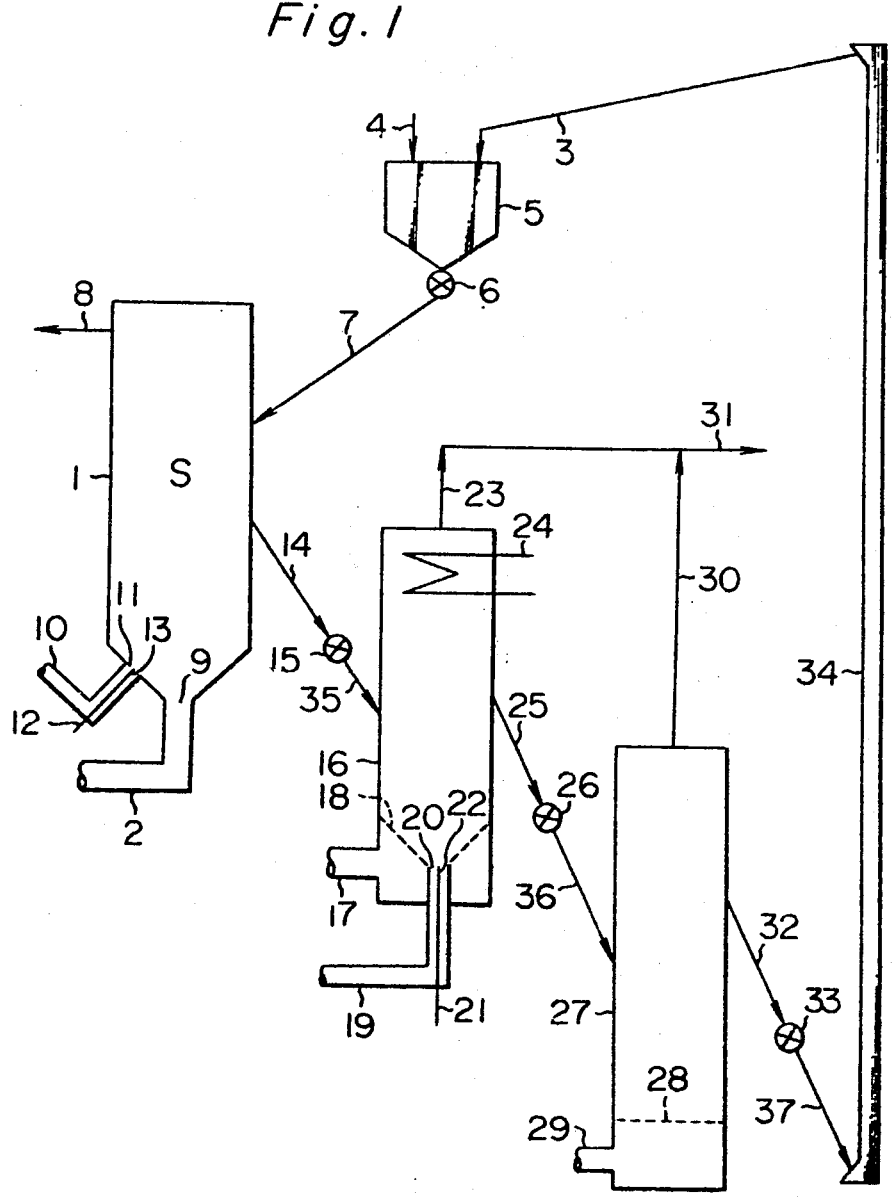
FIG. 1 is a diagram illustrating an example of the arrangement of a series of devices suitable for practice of the process of this invention and equipment for regenerating solid particles.

In FIG. 1, solid particles regenerated in a hopper 5 are fed from a conduit 3. If required, fresh solid particles are fed from a conduit 4. Then, the particles are fed into a spouted bed type quenching vessel 1 through a valve 6 and a conduit 7.

Also a high temperature cracked gas formed in a cracking reactor (not shown) by the thermal cracking of a hydrocarbon is introduced to the spouted bed type quenching vessel 1 through a conduit 2 and injected into the vessel 1 at a prescribed velocity from a spout 9 positioned at the bottom of the vessel 1. By this injection of the cracked gas the solid particles in the spouted bed type quenching vessel 1 are fluidized and move upwardly together with the cracked gas in the central portion of the vessel 1. Then, the solid particles descend in the inner wall portion of the vessel 1. In this manner, the solid particles are forcibly circulated in the vessel 1 convectively and a spouted bed S of solid particles is formed.

A quenching liquor composed of water or a liquid hydrocarbon is sprayed into the spouted bed S of the spouted bed type quenching vessel 1 through a conduit 12 from a nozzle 13 positioned in the lower portion of the spouted type quenching vessel 1 with the aid of steam or refined cracked gas injected from conduits 10 and 11, and the high temperature cracked gas fed from the spout 9 is quenched by the latent heat of vaporization of the so sprayed water or liquid hydrocarbon. At the same time, the temperature of tar contained in the cracked gas is kept below the boiling point thereof by the above quenching and is allowed to stick and adhere onto surfaces of the solid particles in the spouted bed S, while carbon is efficiently caught on surfaces of the solid particles wet with deposited tar due to its adhesiveness.

The cracked gas which has been quenched by the above operation and from which carbon and tar have been removed is introduced as the treated cracked gas to the last refining process (not shown) through a conduit 8 positioned in the upper portion of the spouted type quenching vessel 1.

It is preferable that the bottom wall of the spouted type quenching vessel 1 has a frustoconical configuration of an inclination angle of 30°–120°, especially 60°–90 and that the spout 9 is position at the center of this frustoconical bottom wall.

Solid particles in the spouted bed S to which carbon and tar have stuck are continuously withdrawn outside the spouted bed type quenching vessel 1 through a conduit 14 connected to the side wall of the spouted bed type quenching vessel 1 via a valve 15.

Another spouted bed type quenching vessel suitable for the practice of the process of this invention will now be explained by referring to FIG. 2.

In FIG. 2, solid particles are fed into a spouted bed type quenching vessel 39 from a conduit 38 and a high temperature cracked gas from a spout 41 via a conduit 40. In this way, a spouted bed S' is formed in the spouted bed type quenching vessel 39 by fluidization of the solid particles.

Water or a liquid hydrocarbon is sprayed into the spouted bed type quenching vessel 39 from a nozzle 43 via a conduit 42 with an aid of steam or refined cracked gas injected through conduits 44 and 45, and by the latent heat of vaporization of the so sprayed water or liquid hydrocarbon, the high temperature cracked gas is quenched. At the same time, carbon and tar are allowed to stick to the surfaces of the solid particles in the spouted bed S' in a manner as described above.

The cracked gas which has been quenched and from which carbon and tar have been removed is withdrawn from a conduit 46 and introduced to the last refining process (not shown).

As to the solid particles in the spouted bed S' to which carbon and tar have sticked, only coarsened particles having a diameter exceeding a certain level are selectively caused to descend from a spout 47 in a conduit 48 toward a hopper 49 by steam or refined cracked gas projected into the spouted bed S' from the spout 47 via a conduit 50, the hopper 49 and the conduit 48 positioned beneath the spouted bed type quenching vessel 39, according to the so-called "elutriation" principle. In conducting the above operation, it is necessary to feed steam or refined cracked gas to be spouted from the spout 47, at a velocity higher than the superficial gas velocity in an empty column, Uo (m/sec), of the cracked gas fed from the spout 41. When the process of this invention is practised by employing the spouted bed type quenching vessel 39 shown in FIG. 2, the particle size of the solid particles in the spouted bed S' can be optionally adjusted by controlling the velocity of steam or refined cracked gas to be injected from the spout 47, and only coarsened particles whose size exceeds a certain prescribed level with adhesion or sticking of carbon and tar thereon, can be selectively withdrawn from the spouted bed S' efficiently.

In a preferably embodiment of the process of this invention, the high temperature cracked gas is spouted from the bottom of a vessel containing solid particles to thereby fluidize the solid particles and move them upwardly together with the cracked gas, and this upward flow of the fluidized solid particles and the cracked gas is disturbed in a position spaced a certain distance from the spout for the cracked gas.

In the above embodiment, a part of the upward flow of the fluidized solid particles and the cracked gas is shifted in the lateral or downward direction to cause turbulent flows, whereby it is possible to increase the swelling height of the spouted bed, maintain a good spouted condition in the bed and to prolong the contact time between the cracked gas and solid particles, with the result that it is possible to further improve the efficiency of catching carbon and tar contained in the cracked gas.

One or a plurality of baffle plates may be provided spacedly in the longitudinal direction to disturb the upward flow of the fluidized solid particles and the cracked gas. For instance, one or more baffle plates 55 having a plurality of holes 54, such as shown in FIG. 3, may be provided in spouted beds S and S' in spouted bed type quenching vessels 1 and 39 illustrated in FIGS. 1 and 2. For the provision of such baffle plates a supporting rod 56 such as shown in FIG. 4 may be used. In this case, it is desired that the superficial gas velocity in an empty column, Uo (m/sec), of the cracked gas is maintained at 2–5 m/sec and the size of the solid particles in the bed is within a range of 1–2 mm. It is also preferred that the total cross-sectional area of the effective interseption by the baffle plate is ⅛–1/6 of the total effective cross-sectional area of the vessel 1 and 39.

Figure 5:
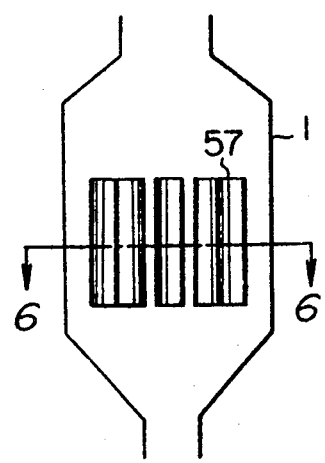
FIG. 5 is a side view showing still another embodiment of the apparatus suitable for the practice of the process of this invention.
Figure 6:
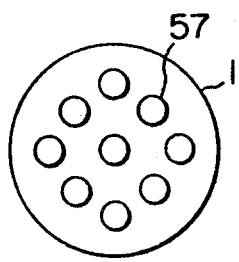
FIG. 6 is a cross-sectional view taken along the line A-A' of FIG. 5.

Instead of the above-described baffle plate 55, one or a plurality of circular tubes 57 such as shown in FIGS. 5 and 6 may be provided. The circular tube is mounted vertically in the spouted bed type quenching vessel in a manner such that the lower end thereof is in a position spaced from the spout for the cracked gas with a distance of 300–800 mm measured longitudinally and the upper end thereof is in a position level with the highest end of the spouted bed of the solid particles formed in the vessel. It is preferred that the diameter and number of tubes 57 are so selected that the corresponding diameter determined by the tubes [4 × cross-sectional area of vessel/(vessel length immersed in spouted bed + tube length immersed in spouted bed)] will be 100–200 mm. In this embodiment using such circular tubes 57, the contact efficiency between the cracked gas and solid particles can be increased and the efficiency of catching carbon and tar contained in the cracked gas can be also increased.

In still another embodiment of this invention, solid particles to which carbon and tar have adhered and stuck are taken out from the above-described spouted bed, introduced into a second vessel and fluidized into the second vessel by means of an oxygen-containing gas, and carbon and tar which have adhered and stuck to surfaces of the solid particles are burnt out from the solid particles, which are then cooled and recycled to a first vessel, namely the spouted bed type quenching vessel.

For conducting this embodiment, a regenerator 16 for regenerating solid particles, which is shown in FIG. 1 is used. Solid particles which have caught carbon and tar thereon and are withdrawn from the spouted bed type quenching vessels 1 and 39 shown in FIGS. 1 and 2 are introduced into the regenerator from a conduit 35 in FIG. 1 or from a conduit 53 via a tube 51 and a valve 52 in FIG. 2. Solid particles fed to the regenerator 16 are kept in the fluidized state by means of an oxygen-containing gas such as air fed from a conduit 17 through a gas distributor 18, or they are forcibly agitated by means of an oxygen-containing gas such as air fed from a gas spout 20 via a conduit 19. Carbon and tar which have stuck and adhered to the particle surface are burnt out at a temperature of 800°–1,000° C. by the oxygen-containing gas, whereby the solid particles are regenerated. If desired, it is possible to conduct the combustion of carbon and heavy tar by injecting a fuel such as heavy oil, naphtha and crude oil from a fuel spout 22 and burning it in the regenerator 16.

The solid particles from which carbon and tar have been removed in the regenerator 16 are fed to a solid particle cooling vessel 27 via a conduit 25, a valve 26 and a conduit 36. The heat of combustion generated by the burning of carbon and tar in the regenerator 16 is recovered in the form of steam by means of a waste heat recovery system 24 mounted in the upper portion of the regenerator 16. The waste gas from the regenerator 16 is discharged via conduits 23 and 31.

Solid particles fed into the solid particle cooling vessel 27 are fluidized by means of air fed from a gas distributor 28 through a conduit 29 and cooled. The waste gas from the cooling vessel 27 is discharged through conduits 30 and 31.

Solid particles which have been cooled in the solid particle cooling vessel 27 pass through a conduit 32, a valve 33 and a conduit 37, and then are fed to the hopper 5 via a backet elevator 34 and a conduit 3.

In the spouted bed type quenching vessels of FIGS. 1 and 2 suitable for the practice of the process of this invention, the number of the cracked gas spout 9 or 41 is not limited to one, but 2 or more spouts may be provided. It is also possible to provide a plurality of nozzles 13 or 43 on the side wall of the spouted bed type quenching vessel 1 or 39.

The process of this invention has been described by referring to FIGS. 1, 2, 3, 4, 5 and 6, but the process of this invention is not limited to embodiments using devices shown in these FIGURES.

In accordance with the process of this invention, both quenching of the high temperature cracked gas product and removal of carbon and tar can be accomplished at the same time, and the stickiness of heavy tar is skillfully utilized for removal of carbon. Further, in the process of this invention, it is quite unnecessary to conduct the treatment of cleaning a great amount of a contaminated washing liquid such as water or a hydrocarbon, and the quenching of the high temperature cracked gas product and the removal of carbon and tar can be efficiently attained by spraying a small amount of water or a liquid hydrocarbon. Still further, the temperature of the spouted bed can be easily controlled by controlling the amount of such liquid sprayed, and the cracked gas product can be quenched to a desired temperature. Moreover, in accordance with the process of this invention, the operations of withdrawing solid particles which have caught carbon and tar, from the spouted bed and regenerating them for recycle are very easy, and heat generated by combustion of carbon and tar can be efficiently recovered. Furthermore, in the process of this invention it is unnecessary to employ a gas distributor, the use of which is indispensable in the conventional process utilizing a fluidized bed. Accordingly, in the process of this invention clogging of the quenching apparatus, which is frequently brought about in the process using a conventional fluidized bed, does not occur, and the maintenance of the equipment can be made with ease. These are typical instances of industrial effects and advantages attained by the process of this invention.

This invention will now be described more specifically by referring to examples.

EXAMPLES 1 TO 5

A high temperature cracked gas product of the following composition obtained by the thermal cracking of Minas crude oil was treated by employing a spouted bed type quenching vessel of a model shown in FIG. 1, which was provided with a cracked gas spout 9 of an inner diameter of 110 mm, a conduit 14 of an inner diameter of 41.6 mm for withdrawing solid particles on which carbon and tar have been caught, a conduit 7 of an inner diameter of 41.6 mm for feeding solid particles, a nozzle 13 of an inner diameter of 1.5 mm for feeding water or liquid hydrocarbon, a conduit 11 of an inner diameter of 4.5 mm for feeding steam or refined cracked gas to be used for spraying water or liquid hydrocarbon, and a conduit 8 of an inner diameter of 155.2 mm for withdrawing the treated cracked gas product; the vessel 1 had an inner diameter of 450 mm and a height of 2,150 mm.

Cracked Gas Product Composition

| Components | % by volume |
|---|---|
| $H_2$ | 7.0 |
| $CH_4$ | 9.5 |
| $C_2H_2$ | 0.4 |
| $C_2H_4$ | 15.4 |
| $C_2H_6$ | 1.7 |
| $C_3H_6$ | 5.1 |
| $C_3H_8$ | 0.2 |
| $C_4H_6$ | 1.0 |
| $C_4H_8$ | 1.1 |
| CO | 6.0 |
| $CO_2$ | 13.2 |
| $O_2$ | 0.1 |
| $N_2$ | 0.2 |
| light oil (boiling point lower than 150°C.) | 0.7 |
| heavy oil (boiling point of 150 – 300°C.) | 0.6 |
| tar | (see Table 1) |
| carbon | (see Table 1) |
| steam | 37.8 |

As solid particles to be fluidized, particles of mullite ($3Al_2O_3 2SiO_2$) were used having a diameter of 1-2 mm, and solid particles which had caught carbon and tar thereon were regenerated by an apparatus such as shown in FIG. 1, and recycled and used repeatedly.

The inclination angle of the frustoconical bottom wall (divergent angle at the spout portion) of the spouted bed type quenching vessel 1 was adjusted to 60°.

The continuous operation was conducted for 72 hours under conditions indicated in Table 1 and the results shown in Table 1 were obtained.

In Examples 1 to 3, the resident amount of the solid particles was kept constant, but the temperature of the spouted bed differed. In Examples 4 and 5, the temperature of the spouted bed and the resident amount of the solid particles were made constant, but the amount of solid particles recycled differed.

TABLE 1

| | Ex. 1 | Ex. 2 | Ex. 3 | Ex. 4 | Ex. 5 |
|---|---|---|---|---|---|
| Operation Conditions | | | | | |
| cracked gas temperature (°C.) | 800 | 800 | 800 | 800 | 800 |
| tar content in cracked gas (g/Nm³ dry gas) | 20.3 | 20.3 | 20.3 | 20.3 | 20.3 |
| carbon content in cracked gas (g/Nm³ dry gas) | 47.3 | 47.3 | 47.3 | 47.3 | 47.3 |
| feed rate of cracked gas (m³/hr at 800°C.) | 1482 | 1482 | 1482 | 1482 | 1482 |
| velocity of cracked gas at spout outlet (m/sec) | 43.3 | 43.3 | 43.3 | 43.3 | 43.3 |
| amount sprayed of water (kg/hr) | 114.1 | 97.9 | 82.4 | 97.9 | 97.9 |
| amount of steam for water-spraying (kg/hr) | 38.1 | 32.6 | 27.5 | 32.6 | 32.6 |
| amount of solid particles resident in bed (kg) | 90 | 90 | 90 | 90 | 90 |
| amount recycled of solid particles (kg/hr) | 120 | 120 | 120 | 90 | 150 |
| feed rate of solid particles (kg/hr) | 3 | 3 | 3 | 3 | 3 |
| superficial gas velocity in an empty column (m/sec) | 2.26 | 2.32 | 2.37 | 2.32 | 2.32 |
| Results | | | | | |
| temperature of treated cracked gas at vessel outlet (°C.) | 350 | 400 | 450 | 400 | 400 |
| tar content in treated cracked gas (g/Nm³ dry gas) | 4.0 | 6.1 | 7.3 | 6.3 | 5.9 |
| carbon content in treated cracked gas (g/Nm³ dry gas) | 7.1 | 11.8 | 14.7 | 12.3 | 11.3 |
| amount of tar caught on solid particles (g/kg solid particles) | 22.0 | 19.3 | 17.6 | 25.3 | 15.6 |
| amount of carbon caught on solid particles (g/kg solid particles) | 54.6 | 48.2 | 44.3 | 63.3 | 39.0 |

EXAMPLES 6 AND 7

A high temperature cracked gas product obtained by the thermal cracking of Minas crude oil was treated by using the spouted bed type quenching vessel 1 used in Example 1, in which two baffle plates, shown in FIG. 3, of an inner diameter of 240 mm having 4 holes of an inner diameter of 50 mm were provided. As is illustrated in FIG. 4, one of the baffle plates was positioned 745 mm above the spout 9 for injecting the cracked gas and other was positioned 1,195 mm above spout 9. As the solid particles, particles of mullite ($3Al_2O_3 2SiO_2$) having a diameter of 1-2 mm were used. Solid particles which had caught carbon and tar thereon were regenerated in the apparatus such as shown in FIG. 1, and recycled and used repeatedly. The continuous operation was conducted for 72 hours under conditions indicated in Table 2. The results shown in Table 2 were obtained.

TABLE 2

| | Example 6 | Example 7 |
|---|---|---|
| Operation Conditions | | |
| cracked gas temperature (°C.) | 800 | 800 |
| tar content in cracked gas (g/Nm³ dry gas) | 20.3 | 20.3 |
| carbon content in cracked gas (g/Nm³ dry gas) | 47.3 | 47.3 |
| velocity of cracked gas (m³/hr at 800°C.) | 1482 | 1482 |
| flow rate of cracked gas at spout outlet (m/sec) | 43.3 | 43.3 |
| amount sprayed of water (kg/hr) | 97.9 | 97.9 |
| amount of steam for spraying water (kg/hr) | 32.6 | 32.6 |
| amount of solid particles resident in bed (kg) | 120 | 150 |
| amount recycled of solid particles (kg/hr) | 120 | 120 |
| feed rate of solid particles (kg/hr) | 3 | 3 |
| superficial gas velocity in an empty column (m/sec) | 2.32 | 2.32 |
| Results | | |
| temperature of treated cracked gas at vessel outlet (°C.) | 400 | 400 |
| tar content in treated cracked gas (g/Nm³ dry gas) | 5.3 | 4.5 |
| carbon content in treated cracked gas (g/Nm³ dry gas) | 9.9 | 8.0 |
| amount of tar caught on solid particles (g/kg solid particles) | 20.4 | 21.5 |
| amount of carbon caught on solid particles (g/kg solid particles) | 50.7 | 53.3 |

EXAMPLE 8

The spouted bed type quenching vessel 1 of an inner diameter of 450 mm was provided with 12 of circular tubes 57 of an inner diameter of 3 inches, a thickness of 4 mm and a length of 700 mm, as is illustrated in FIGS. 5 and 6. These tubes were arranged in an equilateral triangular form of a 150 mm pitch, and they were inserted longitudinally in the vessel 1 in a manner such that the lower end thereof would be positioned 500 mm above the spout 9 for projecting the cracked gas. With use of such vessel 1 a high temperature cracked gas product obtained by the thermal cracking of Minas crude oil was treated to remove carbon and tar. As the solid particles to be spouted in the spouted bed spherical particles of mullite ($3Al_2O_3 \cdot 2SiO_2$) having a diameter of 1–2 mm were used. The solid particles which had caught carbon and tar thereon were burnt at 900° C. by air in the regenerator shown in FIG. 1, and the regenerated solid particles were recycled and used repeatedly. The continuous operation was conducted for 72 hours under conditions indicated in Table 3. Results are also shown in Table 3.

TABLE 3

| | Example 8 |
|---|---|
| Operation Conditions | |
| temperature of cracked gas (°C.) | 800 |
| tar content in cracked gas (g/Nm³ dry gas) | 20.3 |
| carbon content in cracked gas (g/Nm³ dry gas) | 47.3 |
| feed rate of cracked gas (m³/hr at 800°C.) | 1482 |
| velocity of cracked gas at spout outlet (m/sec) | 43.3 |
| amount sprayed of water (kg/hr) | 97.9 |
| amount of steam for spraying water (kg/hr) | 32.6 |
| amount of solid particles resident in bed (kg) | 120 |
| amount recycled of solid particles (kg/hr) | 90 |
| feed rate of solid particles (kg/hr) | 3 |
| superficial gas velocity in an empty column (m/sec) | 2.32 |
| Results | |
| temperature of treated cracked gas at vessel outlet (°C.) | 400 |
| tar content in treated cracked gas (g/Nm³ dry gas) | 3.6 |
| carbon content in treated cracked gas (g/Nm³ dry gas) | 7.4 |
| amount of tar caught on solid particles (g/kg solid particles) | 30.1 |
| amount of carbon caught on solid particles (g/kg solid particles) | 72.1 |

What we claim is:

1. A process for removing carbon and tar from a cracked gas product, which comprises spouting a high temperature cracked gas product containing carbon and tar, formed by the thermal cracking of a hydrocarbon, from the bottom of a vessel in which inorganic solid particles are contained, thereby forming a spouted bed of said solid particles in said vessel; and spraying water or a liquid hydrocarbon in said spouted bed of said solid particles to thereby quench said cracked gas product and to simultaneously deposit and stick the carbon and tar contained in said cracked gas product onto the surfaces of said solid particles.

2. The process claim 1, wherein said water or liquid hydrocarbon is fed in an amount sufficient to maintain the temperature of said spouted bed at 200°–600° C.

3. The process of claim 1, wherein said solid particles have a diameter of 0.1–6 mm.

4. The process of claim 1, wherein said solid particles are selected mullite particles and alumina-silica particles.

5. The process of claim 1, wherein said cracked gas product is fed at a superficial gas velocity in an empty column of 1–10 m/sec.

6. A process for treating a cracked gas product formed by the thermal cracking of a hydrocarbon, which comprises spouting a high temperature cracked gas product containing carbon and tar, formed by the thermal cracking of a hydrocarbon, from the bottom of a first vessel in which inorganic solid particles are contained, thereby forming a spouted bed of said solid particles in said first vessel; spraying water or a liquid hydrocarbon in said spouted bed of said solid particles to thereby quench said cracked gas product and to simultaneously deposit and stick the carbon and tar contained in said cracked gas product onto the surfaces of said solid particles; withdrawing from said spouted bed the solid particles which have carbon and tar deposited thereon; introducing the solid particles withdrawn from the spouted bed into a second vessel; fluidizing the solid particles in said second vessel by means of an oxygen-containing gas; burning off the carbon and tar deposited on the surfaces of the solid articles in said second vessel; cooling the solid particles from which the carbon and tar have been burnt off; and recycling the cooled solid particles to said first vessel.

* * * * *